United States Patent [19]

Cazalaa et al.

[11] 4,046,157

[45] Sept. 6, 1977

[54] ELECTRICAL CONTROL FOR INFLATING VALVE FOR CONTAINERS FOR COMPRESSED LIQUEFIED OR DISSOLVED GAS

[76] Inventors: Jean Michel Cazalaa, 49 Av du Onze Novembre, 92190 Meudon; Alexandre Jean-Paul Barthe, 58 rue J.B. Baudin App. 14, 94800 Ville Juif; André Robert Derrien, La Porte au Brun, 91160 Ballainvilliers, all of France

[21] Appl. No.: 628,767

[22] Filed: Nov. 4, 1975

[30] Foreign Application Priority Data

Nov. 5, 1974 France ............................... 74.36744

[51] Int. Cl.[2] ........................ F16K 17/40; F16K 31/40

[52] U.S. Cl. ........................................ 137/74; 137/76; 222/3

[58] Field of Search .................................... 137/72-76; 220/89 B, 201; 122/504.1, 504.3; 169/19, 37, 42, 57; 222/54, 3

[56] References Cited

U.S. PATENT DOCUMENTS

| | | | |
|---|---|---|---|
| 328,008 | 10/1885 | Conner et al. | 220/89 A |
| 1,734,186 | 11/1929 | Weidmann et al. | 137/72 X |
| 2,620,815 | 12/1952 | Margraf et al. | 137/72 X |
| 2,998,018 | 8/1961 | Beck et al. | 137/74 |
| 3,889,991 | 6/1975 | Hewitt | 137/74 X |

FOREIGN PATENT DOCUMENTS

| | | | |
|---|---|---|---|
| 1,028,619 | 5/1953 | France | 137/72 |
| 2,032,957 | 1/1972 | Germany | 137/72 |

*Primary Examiner*—Martin P. Schwadron
*Assistant Examiner*—Richard Gerard
*Attorney, Agent, or Firm*—Cushman, Darby & Cushman

[57] ABSTRACT

An electrical control device for an inflating valve for containers for compressed, liquefied or dissolved gas with a cylindrical plug of fusible non-conductive material in which is embedded a helically wound electrical resistor formed as a cylinder having an axis substantially parallel to the plug axis and adapted to be connected to an electrical source. The plug is maintained in the inflating valve by a sleeve provided with a cavity and radial openings. Upon closing of the electrical circuit, the resistor heats and melts the plug, the central portion of which escapes towards the upper portion of the cavity opening to open a passage between the port connected to the container and the discharge port of a rotatable fitting surrounding the inflating head. The present invention can be used advantageously to control the discharge of a gas contained in a container in a pneumatic capacity and especially an inflatable lifeboat.

3 Claims, 5 Drawing Figures

ELECTRICAL CONTROL FOR INFLATING VALVE FOR CONTAINERS FOR COMPRESSED LIQUEFIED OR DISSOLVED GAS

BACKGROUND OF THE INVENTION

1. Field of the Invention

The present invention relates to an electric control device for an inflating valve for containers of compressed, liquefied or dissolved gas.

2. Description of the Prior Art

In the devices known in the prior art, the opening of the inflating valve is usually controlled by a mechanical device operated by a cable or a pyrotechnic cartridge. The drawback of such a system is the use of movable parts which are in contact with the surrounding atmosphere which may be corrosive in particular when the containers are used for inflating pneumatic capacities for rescue at sea. After a long storage period, these movable parts are often damaged by corrosion and do no react suitably to the control impulses which are given in case of emergency. On the other hand, the movable parts may lock through gumming of the seals after an extended storage period. Furthermore, in case of devices operated by firing a pyrotechnic device, the reliability thereof depends on the ignition which is often aleatory for such known pyrotechnic devices.

SUMMARY OF THE INVENTION

A main object of the present invention is to provide an inflating valve of a novel type which is of a simple concept and provides a fail safe operation over extended periods of time.

Another object of the present invention is to provide an inflating valve the opening of which is electrically controlled without any mechanical movable part.

Still another object of the present invention is to increase the operating reliability of the system with the possibility, at low cost, to provide a dual electric control for opening of the gas circuit (redundancy).

An important advantage of the present invention is that a minimum number of components are necessary.

Another advantage of the present invention is that the device is practically insensitive to vibrations and to the most severe climatic conditions.

Still another advantage of the present invention is that the period of time necessary for opening the valve can be varied by using various electrical supply currents.

According to an alternate embodiment of the present invention, the electrical control device permits direct opening of the passage between the container and the discharge part of the container.

According to another embodiment of the present invention, the electrical control device is applied to an unbalanced inflating valve and operates to vent the counterpressure chamber of the valve to the ambient atmosphere.

In both cases, the electric control is provided by means of a plug of a non-conductive fusible material in which is embedded a helically wound resistor the ends of which are connected to an electric supply through a switch. Upon closing of the electrical circuit, heating of the helically would resistor provides fusion of the material of the plug at right angles with the wires and its central cylindrical portion can thus move and then open the circuit of the gas.

BRIEF DESCRIPTION OF THE DRAWINGS

Other objects and advantages of the present invention will be better understood with reference to the following description of a preferred embodiment taken in relation with the attached drawings.

DESCRIPTION OF THE PREFERRED EMBODIMENT

Figure 1:
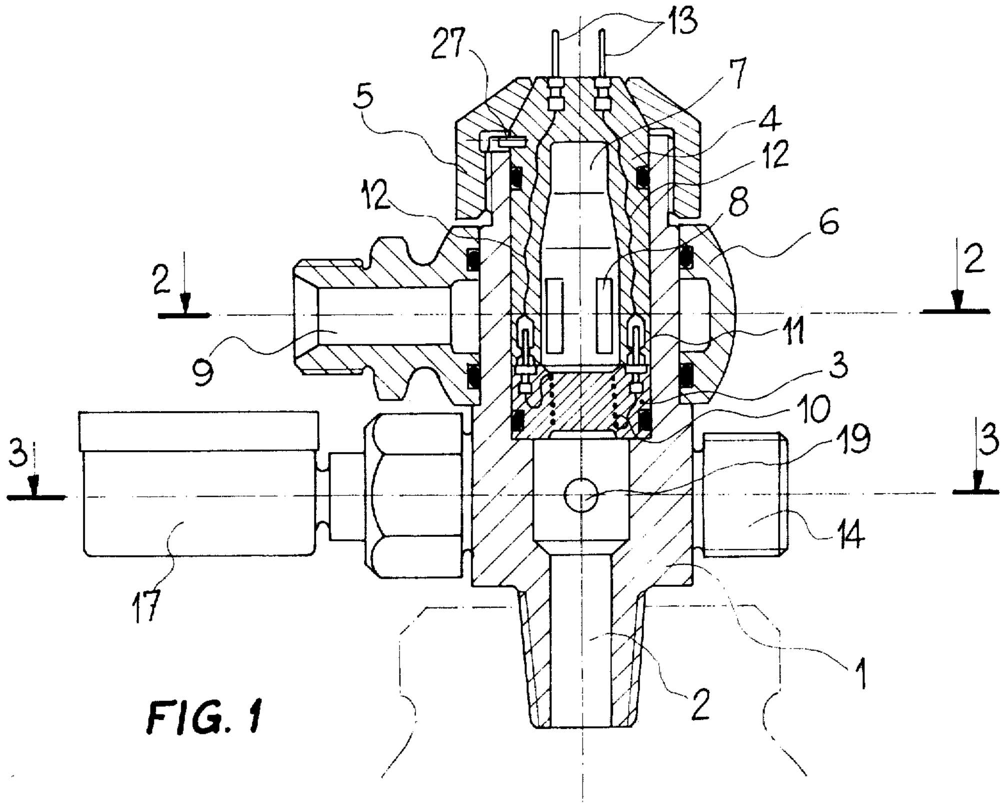
FIG. 1 is a cross-section along line 1—1 of FIG. 3 of a first embodiment of the present invention.
Figure 2:
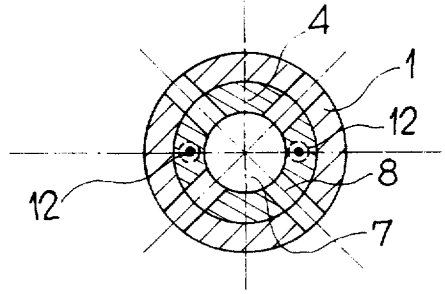
FIG. 2 is a cross-section along line 2—2 of FIG. 1.
Figure 3:
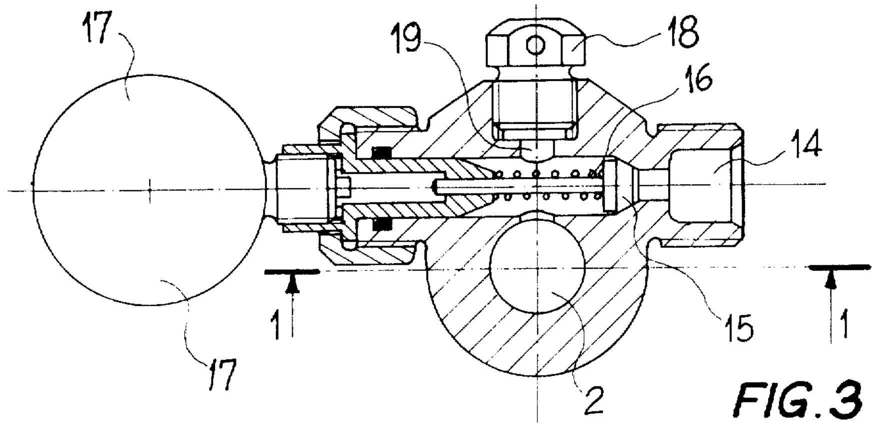
FIG. 3 is a cross-section along line 3—3 of FIG. 1.

Referring now to FIGS. 1 to 3, the inflating valve comprises a body 1 comprising a port 2 for connection with the containei of compressed, liquefied or dissolved gas. Within a bore of body 1 communicating with port 2 is positioned a plug 3 of a fusible material maintained by a sleeve 4, said sleeve 4 being maintained within the bore by a cover 5. Said cover 5 is also used for maintaining a rotatable fitting 6 which is positioned around the body and permits the discharge of the gas as will be explained hereunder. The sleeve 4 comprises a longitudinal cavity 7 provided with radial openings 8 corresponding to similar openings within the body 1 and provided for connecting the cavity 7 with the annular internal groove of the rotatable fitting 6 so that the gas escaping from cavity 7 can be discharged through the exhaust port 9 of the fitting.

The plug 3 comprises a helically wound resistor 10, the ends of which are connected to terminals 11 to be connected with current supplying wires 12 positioned within sleeve 4. Sleeve 4 comprises at its upper part terminals 13 connected to wires 12 for connection between the control device and an external electrical supply (not shown). The inflating valve further comprises, as generally known, a discharge port 14 provided with a non return valve 15 maintained closed by a spring 16. A pressure gauge 17 can also be provided and a pressure relief valve 18 communicating with the bottle through an intermediate aperture 19. Seals are provided between plug 3 and the bore within the body 1, between sleeve 4 and the bore within both 1 and between the rotatable fitting and the external wall of body 1 in order to prevent any leakage of gas towards the outside during the storage and the discharge of the bottle.

Plug 3 and sleeve 4 are shown here as separate parts, it will be clear that they may be integral provided that cavity 7 is formed with openings 8. When assembling the device, openings must be in line with the corresponding openings within body 1, in this respect an indicator pin 27 can be provided on sleeve 4 (FIG. 1) positioned within a notch of body 1.

The operation of the inflating valve is the following:

After having charged the bottle through port 14, the terminals 13 are connected to the electrical supply while maintaining the circuit opened by means of a switch. When the switch is closed, the electric current heats the resistor 10 which fuses the fusible material at right angles with the turns of the resistor. The central portion of the plug 3 is then separated from the plug and projected by the gas pressure in the container towards the upper part of cavity 7. As shown, cavity 7 may have a shape enabling jamming of the central portion in the upper part of the cavity. The container then discharges through the radial openings 8 and fitting 6.

It will be noted that in this case, the container operates without the use of any movable mechanical part and the reliability of the system can be increased by the provision of two helically wound resistors 10 and two pairs of terminals 13 connected to different electric supplies providing a supplementary security in case one of the electric supplies would fail.

Figure 4:
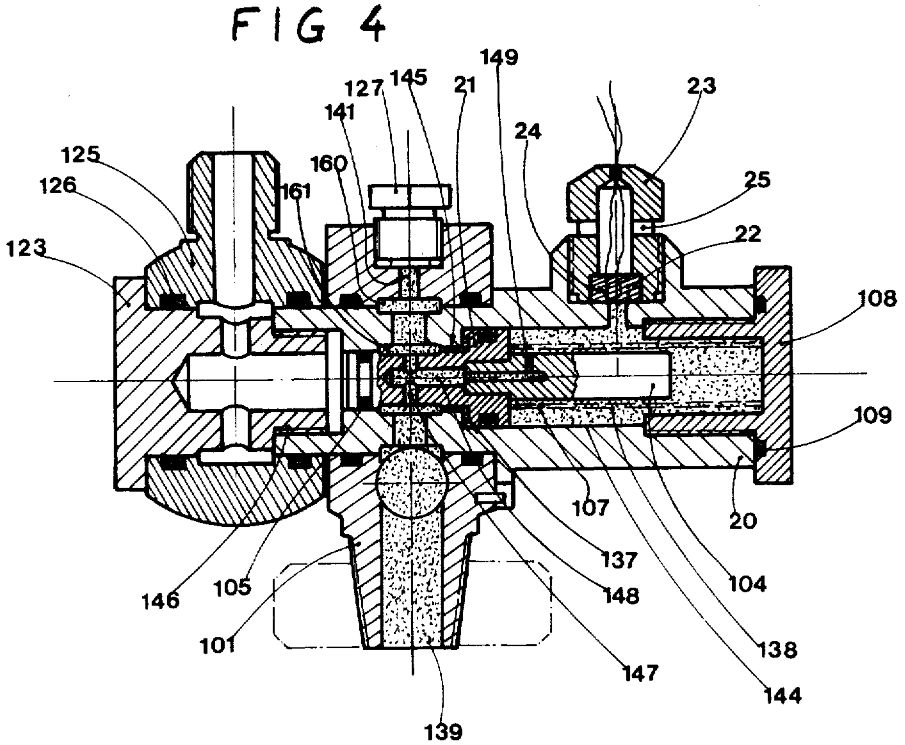
FIG. 4 is a cross-section of another embodiment of the present invention using an unbalanced inflating valve.
Figure 5:
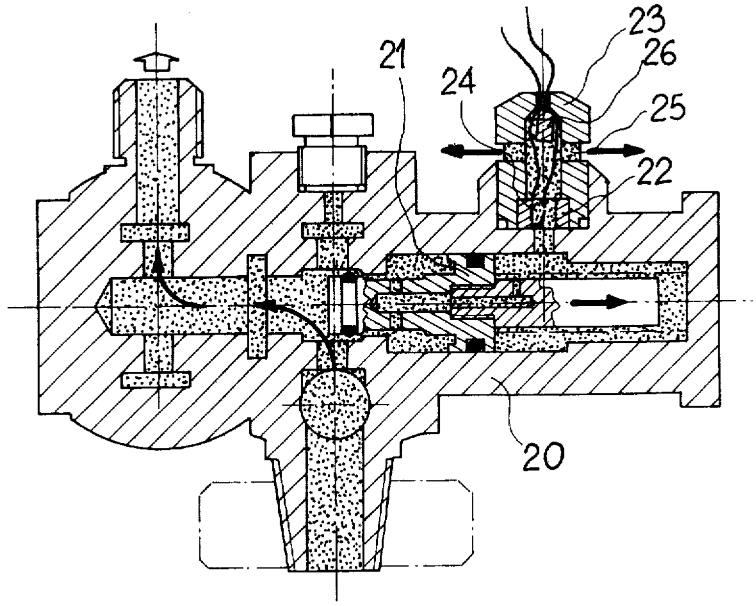
FIG. 5 is a cross-section similar to that of FIG. 4 with the control device vented to the ambient atmosphere in an opened position.

FIGS. 4 and 5 show an alternative embodiment according to which the discharge of the bottle is not provided directly through the passage within the fusible plug but through the use of a differential system. The inflating valve then comprises a main body 101 provided with a bore in which extends a hollow cylinder 20. The main body 101 is provided with a plurality of ports 139, 141 connected respectively with the gas container and a pressure-relief valve 127. The main body 101 also includes a port (not shown) for charging the container, lying in the same plane as the ports 139 and 141.

Cylinder 20 is provided with a plurality of radial ports lying in the plane of ports 139, 141 of the main body which enable the various ports of the main body and the internal bore of cylinder 20 to be in communication. The internal bore of the cylinder 20 is axially disposed and comprises a reduced diameter portion 145 between two large diameter portions 144 and 146. The large diameter 144 of the bore is sealingly closed by a plug 108, the seal being provided by an O-ring seal 109 located in a groove machined in the plug head. At its opposite end the large diameter internal bore 146 receives a rotatable bolt 123 screwed in bore 146, axially and radially drilled in order to establish a communication between the inside of cylinder 20 and of rotatable fitting 125, this fitting being supported on one hand on the outside of cylinder 2 and on the other hand on the outside of bolt 123. O-ring seals 126 are used to provide a seal between the rotatable fitting and its supporting parts. The end fitted with the rotatable fitting is the discharge end, thus this discharge outlet can be oriented as the fitting can be rotated about its center line.

A piston 21 having a head is slidably received within cylinder 20, its smaller diameter portion extending into the bore 145 while its larger diameter is close to that of bore 144 and is received inside bore 144. Piston 21 is normally in a position which prevents the gas of the container from discharging towards the outlet of the valve and is adapted to move to enable discharge to take place upon actuation of the discharge control means. To this end, the extreme portion of the piston opposite to the piston head is normally engaged inside bore 145 beyond the radial ports which are provided therein and this portion is provided with a sealing ring 105. It can thus be seen that as shown in FIG. 4, the gas contained in the container cannot escape towards the outlet fitting 125. The portion of piston 21 which extends between the radial ports and the piston head is of a slightly smaller diameter than that of bore 145 in order to enable the gas stored in the container to exert a pressure in chamber 137 formed by an annular groove in the head of piston 21. Annular grooves 160 and 161, respectively, are provided around the periphery of cylinder 20 and piston 21 in order to establish a communication between all the radial ports lying in the same plane. Piston 21 further includes a stopper 104 protruding from the head towards the plug 108 and acting as a guide for a spring 107 positioned between the extreme surface of the head of piston 21 and the internal surface of plug 108. Piston 21 includes a plurality of radial ports 147 positioned in the plane of ports 139 and 141. When the piston is seated in shut-off position, an axial bore 148 which extends in portion 104 of the piston is communicating radial ports 147 with a radial orifice 149 drilled in portion 104. A communication is thus provided between the container and the counter pressure chamber 138 defined by bore 144, head of piston 21 and plug 108. A venting control device for the counter pressure chamber is similar to the device described in relation with FIGS. 1 to 3 and includes a plug 22 similar to plug 3 maintained against the vent port by a sleeve 23 screwed in a boss formed on body 20. Plug 22 includes an helically wound resistor 24 connected to an electrical source by two leads exiting at the upper end of sleeve 23. Sleeve 23 is provided with radial openings 25 for venting the counter pressure chamber as will be explained hereafter in relation with the operation of the device. Of course, it is possible to use, as for the device which has just been described several helically wound resistors thus providing a redundancy.

FIG. 5 shows the device of FIG. 4 during actuation of the container discharge control. When the electrical circuit of the helically wound resistor 24 is being closed. The resistor heats resulting in melting plug 22 at right angles of the resistor windings. The center cylindrical portion 26 of plug 22 is then projected by gas pressure of the counter pressure chamber towards the upper portion of sleeve 23 as shown on FIG. 5 and the counter pressure chamber is vented to the atmosphere by the passage thus created in plug 22 and via a radial opening 25.

Then piston 21 moves under action of the gas pressure of the container and said container is communicated with the outlet part of the rotatable fitting 125. Subsequent operation is in all respects identical to that of similar type valves.

It should be noted that although a differential piston is used in the second alternative embodiment of the device of the present invention, this device remains particularly advantageous as the differential piston is not in contact with the external atmosphere and the control device for the venting operation which is itself in contact with the corrosive external atmosphere does not include any movable mechanical part.

Of importance also is the fact that plug 3, or plug 22, can be maintained by any suitable means permitting communication respectively of the container with the discharge port and venting of the counter pressure chamber. Especially, the sleeve can be a simple ring screwed in the bore and bearing on the periphery of the plug.

While the present invention has been described in relation with preferred embodiments thereof it will be apparent to those skilled in the art that many alternative embodiments and modifications may be made thereof within the scope of the invention.

What is claimed is:

1. An electrical control device for an inflating valve comprising a cylindrical hollow passage for being connected with a container of gas under pressure, said device comprising:

a substantially cylindrical plug made of a fusible material in said passage for blocking and sealing same;

an electrical resistor embedded in said plug and wound in the shape of a cylinder having a longitudinal axis substantially parallel to the axis of the plug and a height substantially equal to the height of the plug;

an electrical source; and means for selectively connecting said electrical source with said resistor for heating and weakening locally the fusible material of said fusible plug at the level of the windings of the cylindrically wound resistor in order that a central portion of said fusible plug corresponding to the cylinder of said windings is separated from the rest of the plug and expelled under the pressure of the gas in said container.

2. An electrical control device according to claim 1, further comprising a cylindrical hollow sleeve in said passage having an open end and being closed at the longitudinally opposite end by a bottom wall, said sleeve contacting said plug by said open end to maintain same at a predetermined position in said passage, means being provided to secure said sleeve in said passage, said sleeve having radial openings longitudinally spaced from said bottom wall of said sleeve.

3. An electrical control device for an inflating valve comprising a cylindrical hollow passage for being connected with a container of gas under pressure, said device comprising:

a substantially cylindrical plug made of a nonconductive fusible material in said passage for blocking and sealing same;

at least one helically wound coil of wire embedded in said plug in the shape of a cylinder having a longitudinal axis substantially parallel to the axis of the plug and a height substantially equal to the height of the plug;

means for selectively connecting said electrical source with said coil of wire for heating and weakening locally the fusible material of said fusible plug at the level of the windings of the helically wound coil in order that a central portion of said fusible plug corresponding to the cylinder of said windings is separated from the rest of the plug and expelled under the pressure of the gas in said container.

* * * * *